(12) United States Patent
Yang et al.

(10) Patent No.: US 11,857,116 B2
(45) Date of Patent: Jan. 2, 2024

(54) DETACHABLE HANDLE FOR COOKING VESSEL

(71) Applicant: Won Jun Yang, Namyangju-si (KR)

(72) Inventors: Won Jun Yang, Namyangju-si (KR); Min Jeong Yang, Namyangju-si (KR)

(*) Notice: Subject to any disclaimer, the term of this patent is extended or adjusted under 35 U.S.C. 154(b) by 0 days.

(21) Appl. No.: 18/056,182

(22) Filed: Nov. 16, 2022

(65) Prior Publication Data
US 2023/0218117 A1 Jul. 13, 2023

(30) Foreign Application Priority Data
Jan. 7, 2022 (KR) .......... 10-2022-0002559

(51) Int. Cl.
A47J 45/07 (2006.01)

(52) U.S. Cl.
CPC .................... A47J 45/07 (2013.01)

(58) Field of Classification Search
CPC .......... A47J 45/07; A47J 45/10; A47J 45/071; B65D 2525/285
See application file for complete search history.

(56) References Cited

U.S. PATENT DOCUMENTS

| | | | | |
|---|---|---|---|---|
| 3,272,547 A * | 9/1966 | Pryce | ...... | A47J 45/08 220/759 |
| 7,883,129 B2 * | 2/2011 | Jung | ...... | A47J 45/10 220/759 |
| 8,235,245 B2 * | 8/2012 | Lorthioir | ...... | A47J 45/10 220/759 |
| 9,016,515 B2 * | 4/2015 | LaFleur | ...... | A47J 45/07 220/759 |
| 9,072,408 B2 * | 7/2015 | Baumgarten | ...... | A47J 45/071 |
| 9,125,523 B2 * | 9/2015 | Bogani | ...... | A47J 37/10 |
| 9,125,524 B2 * | 9/2015 | Cuillery | ...... | A47J 45/10 |
| 2011/0005037 A1 * | 1/2011 | Kim | ...... | A47J 45/10 16/422 |
| 2011/0284565 A1 * | 11/2011 | Corbin | ...... | A47J 45/10 220/759 |
| 2012/0168455 A1 * | 7/2012 | Doyle | ...... | A47J 45/07 220/759 |
| 2016/0045053 A1 * | 2/2016 | Cheng | ...... | B65D 25/28 220/573.1 |
| 2018/0271332 A1 * | 9/2018 | Chang | ...... | A47J 45/10 |
| 2020/0245819 A1 * | 8/2020 | Besche | ...... | A47J 45/071 |
| 2021/0113028 A1 * | 4/2021 | Martin | ...... | A47J 45/07 |
| 2021/0321828 A1 * | 10/2021 | Stevenson | ...... | A47J 45/071 |

FOREIGN PATENT DOCUMENTS

| | | |
|---|---|---|
| KR | 10-2009-0098645 A | 9/2009 |
| KR | 10-1062046 B1 | 9/2011 |
| KR | 10-1388379 B1 | 4/2014 |

* cited by examiner

Primary Examiner — Victor D Batson
Assistant Examiner — Matthew J Sullivan

(57) ABSTRACT

A detachable handle for a cooking vessel includes a body 10; a lever 20 hinged to a lower portion of the body 10; a pressing member 30 installed to be movable forwardly and backwardly in the body 10; a spring 40 elastically supporting the pressing member 30; a cover 50 installed at an upper portion of the body 10; and a button 60 installed to be elastically movable in the cover 50. Accordingly, functionality and usability of the detachable handle for a cooking vessel may be further improved.

2 Claims, 10 Drawing Sheets

DETACHABLE HANDLE FOR COOKING VESSEL

BACKGROUND

Field

The present disclosure relates to a detachable handle for a cooking vessel, and more particularly, to a detachable handle for a cooking vessel that is detachably coupled to one side of a cooking vessel.

Description of the Related Art

In general, cooking vessels have a handle on one side thereof to facilitate movement or storage, and the handle is divided into various types according to the type of the cooking vessels.

A detachable handle that is detachably coupled to one side of the cooking vessel is also one of them.

In particular, demand for detachable handles for cooking vessels has increased due to their excellent functionality, and research and development have been actively conducted in line therewith.

A detachable handle for a cooking vessel of a related art includes a body having an open portion; a lever pin-assembled to a lower portion of the body and exposed to the outside of the body through the open portion; a clamp embedded in the body and having one side supported by a first spring and extending in a longitudinal direction to expose a contact portion in front of the body; a rotating bar hinge-assembled to the body at the rear of the lever, a clamp contact unit in which the other side of an operating bar connected to the clamp is assembled at an oblique angle with the lever by a rotating pin operating along an operating groove of the lever; a holder provided at an upper portion of the clamp and having a fixing portion formed on one side and exposed to the front of the body; a second spring embedded in the body and providing an elastic force so that the holder is pulled into the body; and a button exposed to the outside of the body and having a lower end portion pressing the operating bar down to return the clamp.

Such a detachable handle for a cooking vessel is disclosed in Korean Patent Registration No. 10-0971872.

However, the detachable handle for a cooking vessel described above has a complicated overall configuration, so it is difficult to assemble and maintain and it takes a lot of time and is expensive.

In addition, there is a high possibility of failure or damage due to structural characteristics of the clamp contact unit.

This ultimately results in lowering the functionality and usability of the detachable handle for a cooking vessel.

SUMMARY OF THE INVENTION

The present disclosure has been devised to solve the above problems, and an object to be solved in the present disclosure is to provide a detachable handle for a cooking vessel that is simple in configuration and stably implements an operation.

According to an embodiment of the disclosure, a detachable handle for a cooking vessel includes a body having a vessel support portion formed at a front end thereof; a lever hinged to a lower portion of the body and having an engaging portion protruding therein; a pressing member installed to be movable forwardly and backwardly inside the body and having a vessel pressing portion corresponding to the vessel support portion and a support portion selectively supporting the engaging portion; a spring elastically supporting the pressing member; a cover installed at an upper portion of the body and having a pair of button installation holes formed on both sides thereof; and a button installed to be movable elastically on the cover, protruding to the outside through the pair of button installation holes, and pressing the engaging portion from both sides to release a supported state on the support portion.

The detachable handle for a cooking vessel according to the present disclosure has a simple configuration, so that not only assembly but also maintenance is easy, and time and cost thereof may be relatively reduced.

In addition, an operation of the detachable handle may be implemented stably, and a lifespan (durability) may be further strengthened.

Also, due to the structural characteristics of the button, a lowering operation of the lever may be smoothly implemented.

Therefore, the functionality and usability of the detachable handle for a cooking vessel may be further improved.

BRIEF DESCRIPTION OF THE DRAWING FIGURES

The above and/or other aspects of the disclosure will be more apparent by describing certain embodiments of the disclosure with reference to the accompanying drawings, in which.

Figure 1:
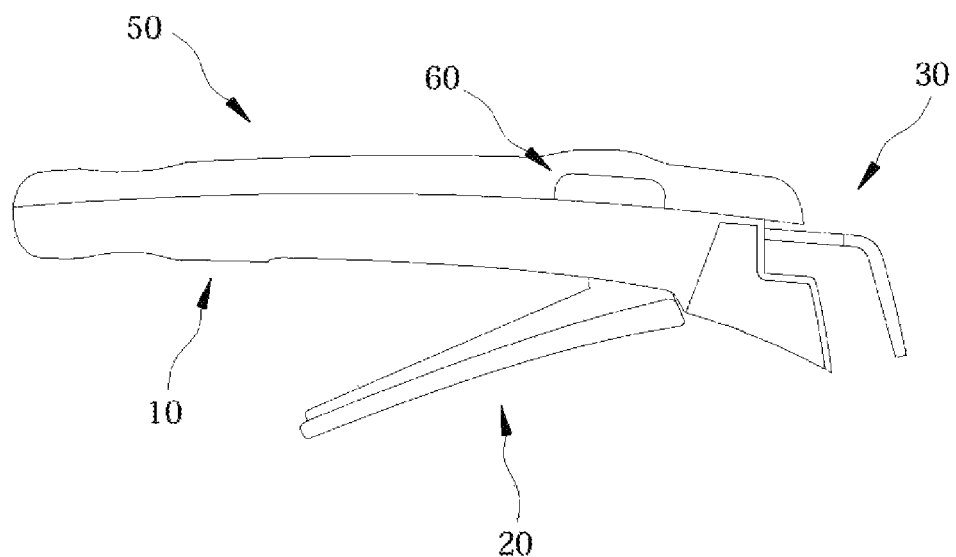
FIG. 1 is a front view of a detachable handle for a cooking vessel according to the present disclosure.
Figure 2:
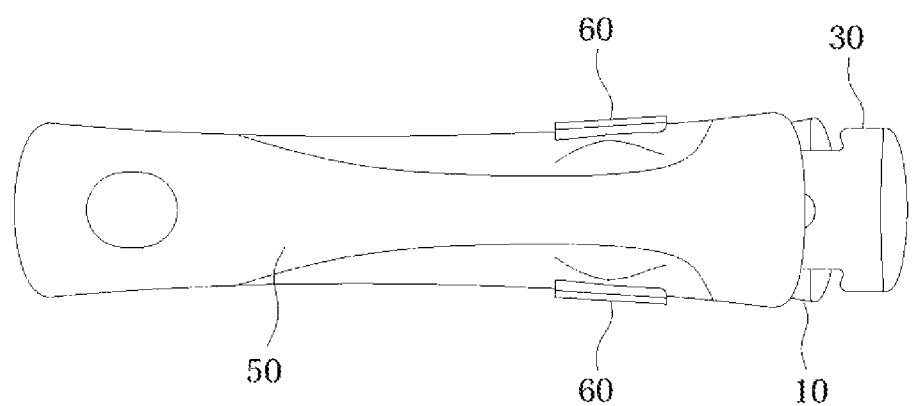
FIG. 2 is a plan view of a detachable handle for a cooking vessel according to the present disclosure.
Figure 3:
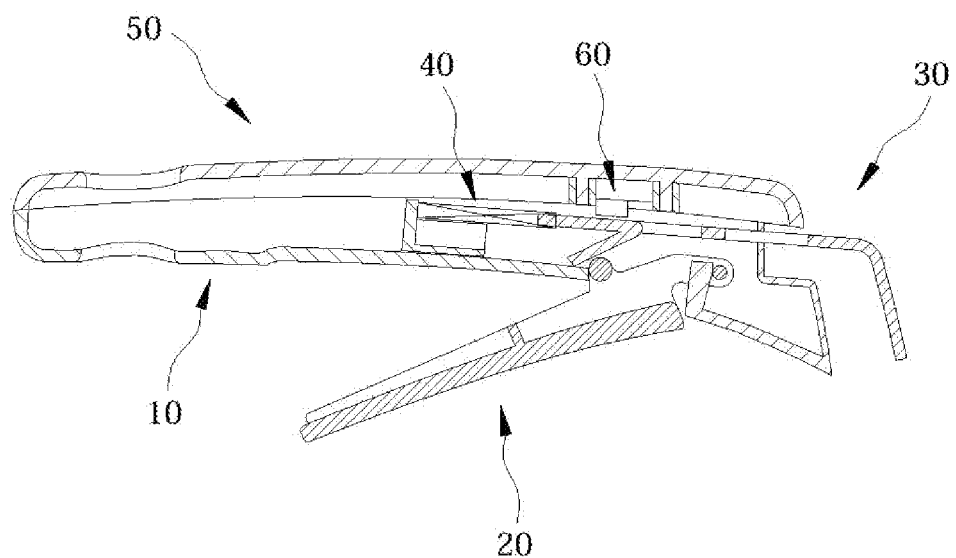
FIG. 3 is a cross-sectional view of a detachable handle for a cooking vessel according to the present disclosure.
Figure 4:
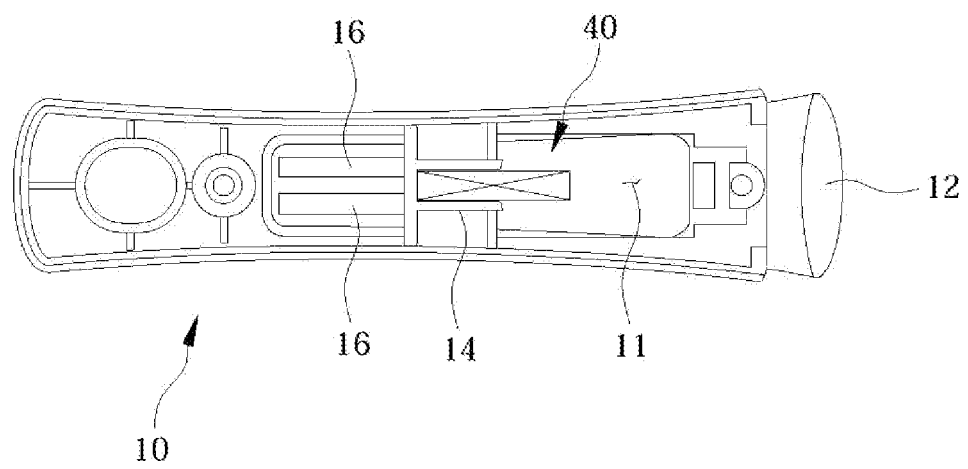
FIG. 4 is a configuration diagram illustrating an internal structure of a body of a detachable handle for a cooking vessel according to the present disclosure.
Figure 5A:
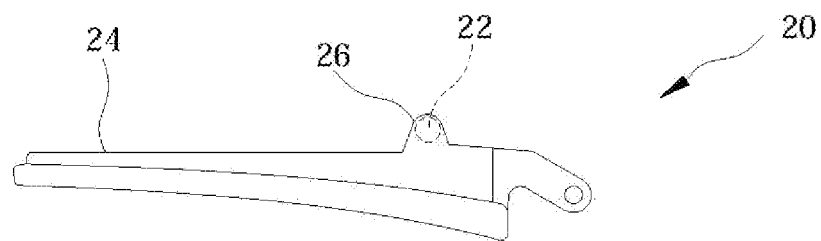
FIGS. 5a and 5b are a configuration diagram illustrating a lever of a detachable handle for a cooking vessel according to the present disclosure.
Figure 5B:
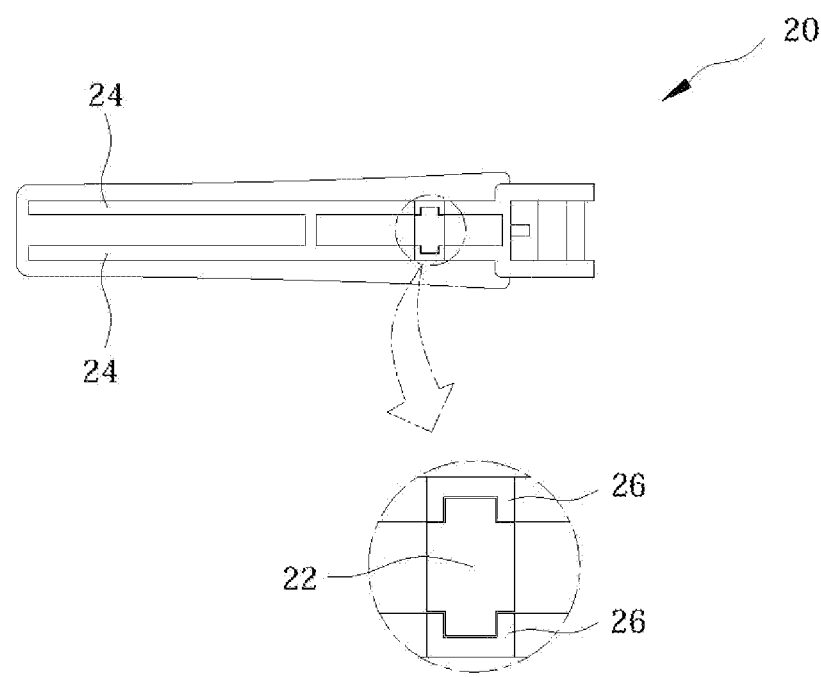
Figure 6:
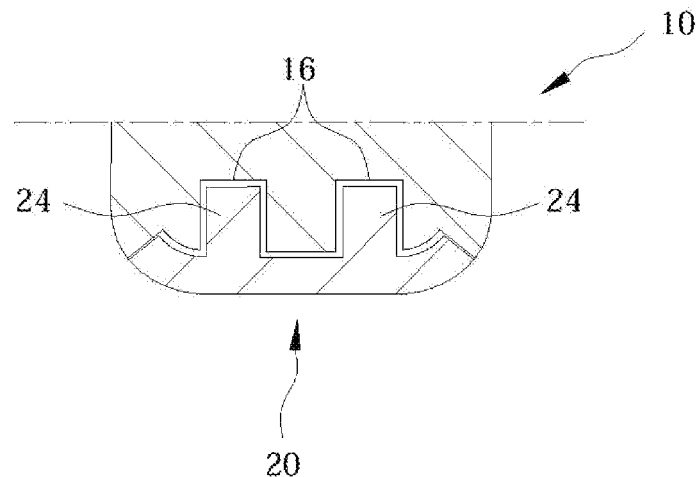
FIG. 6 is a partial cross-sectional view illustrating a coupling structure of a body and a lever of a detachable handle for a cooking vessel according to the present disclosure.
Figure 7A:
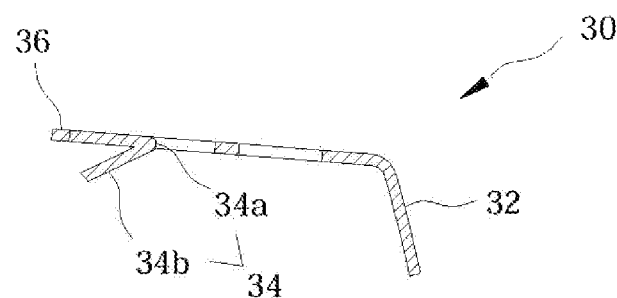
FIGS. 7a and 7b are a configuration diagram illustrating a pressing member of a detachable handle for a cooking vessel according to the present disclosure.
Figure 7B:
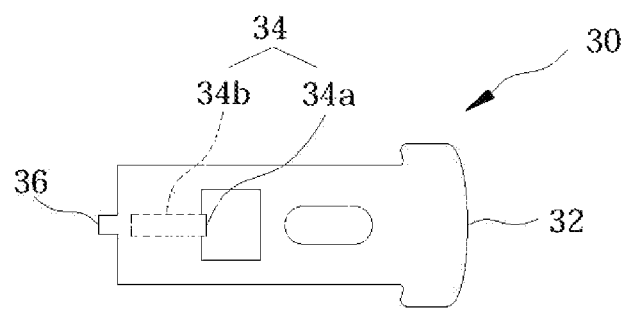
Figure 8:
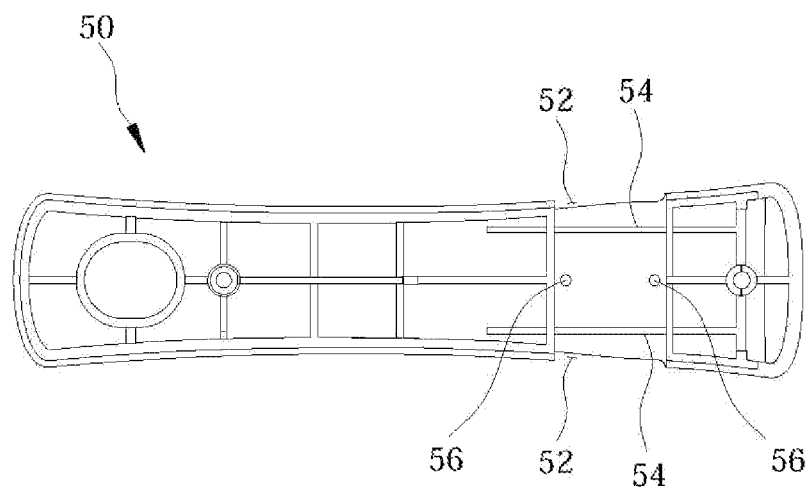
FIG. 8 is a configuration diagram illustrating an internal structure of a cover of a detachable handle for a cooking vessel according to the present disclosure.
Figure 9:
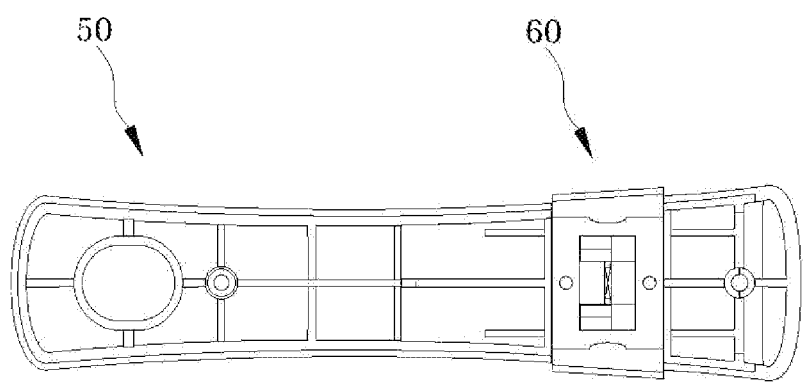
FIG. 9 is a configuration diagram illustrating a button installation state of a detachable handle for a cooking vessel according to the present disclosure.
Figure 10A:
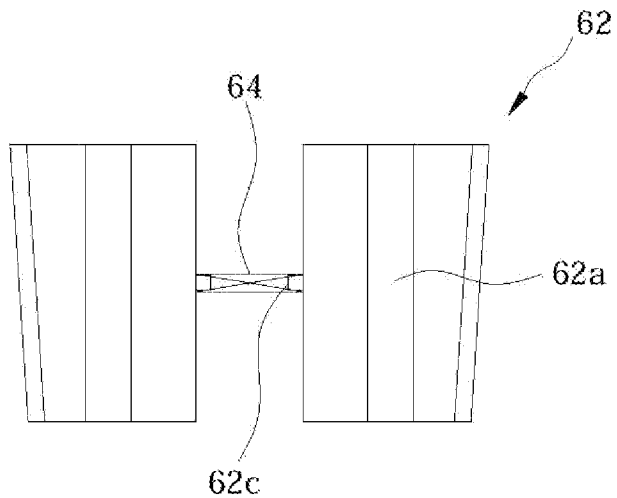
Figure 10B:
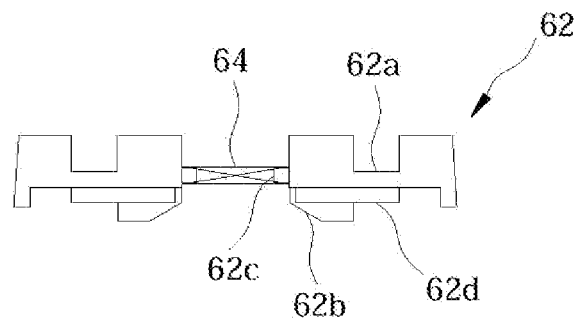
Figure 10C:
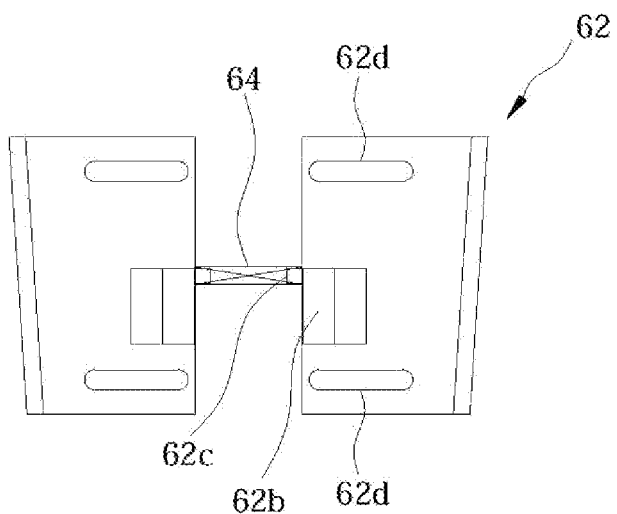
Figure 11A:
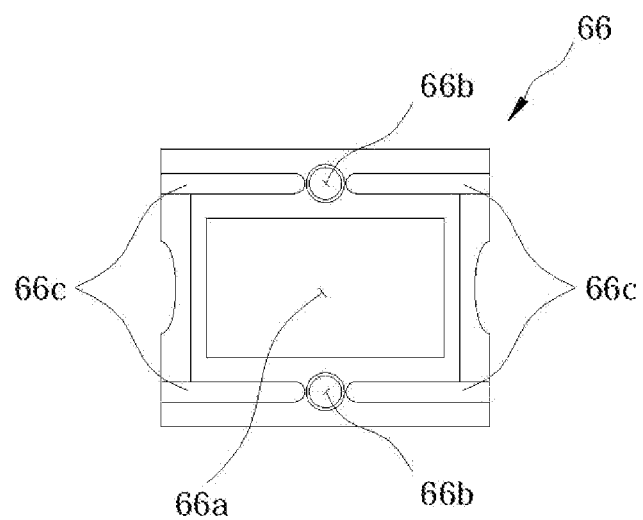
Figure 11B:
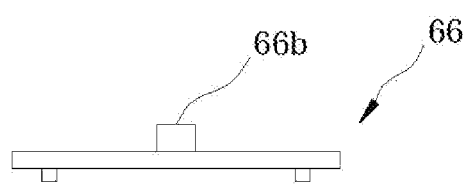
Figure 11C:
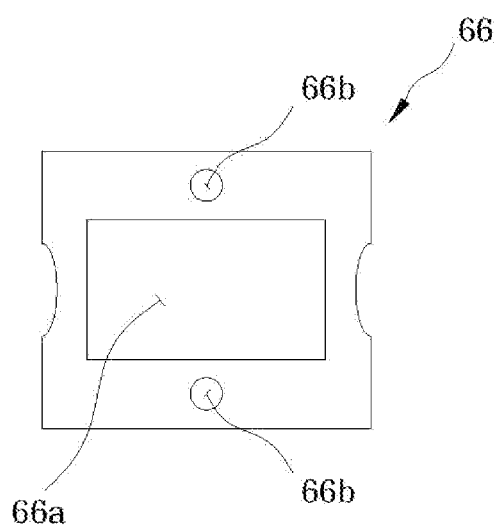
Figure 12:
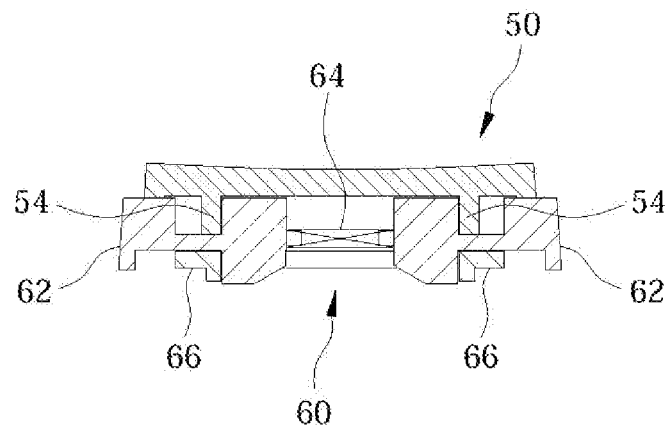
Figure 13A:
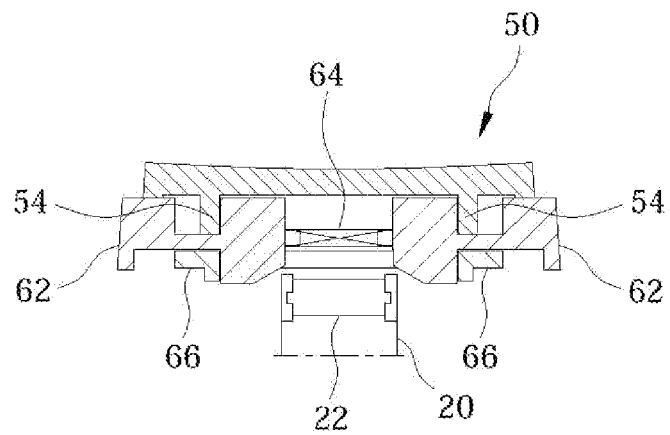
Figure 13B:
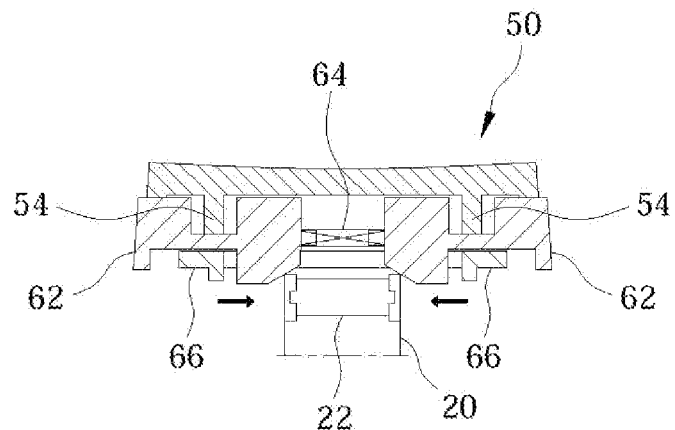
Figure 13C:
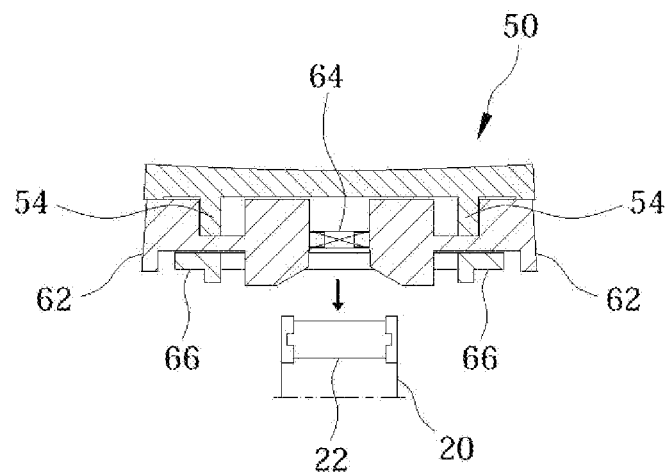
Figure 14A:
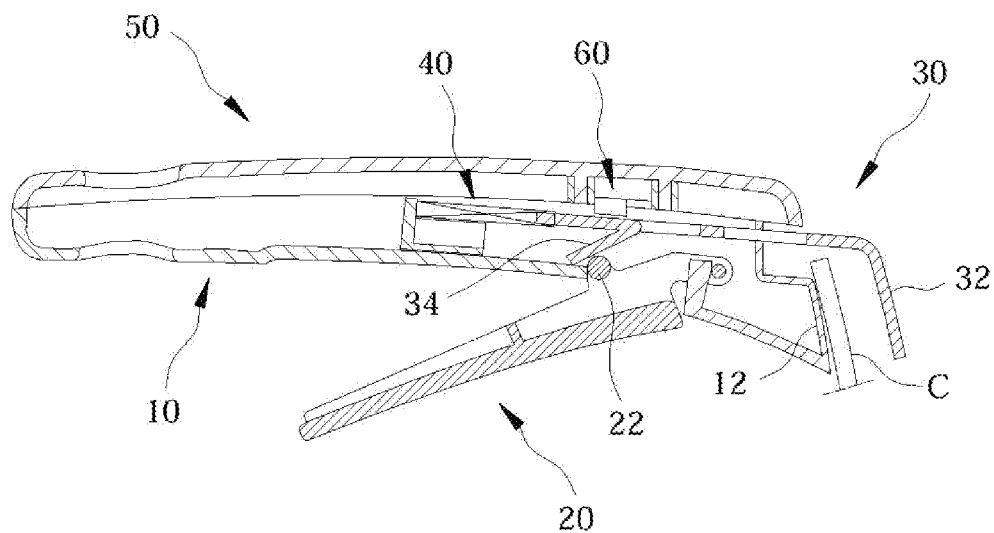
Figure 14B:
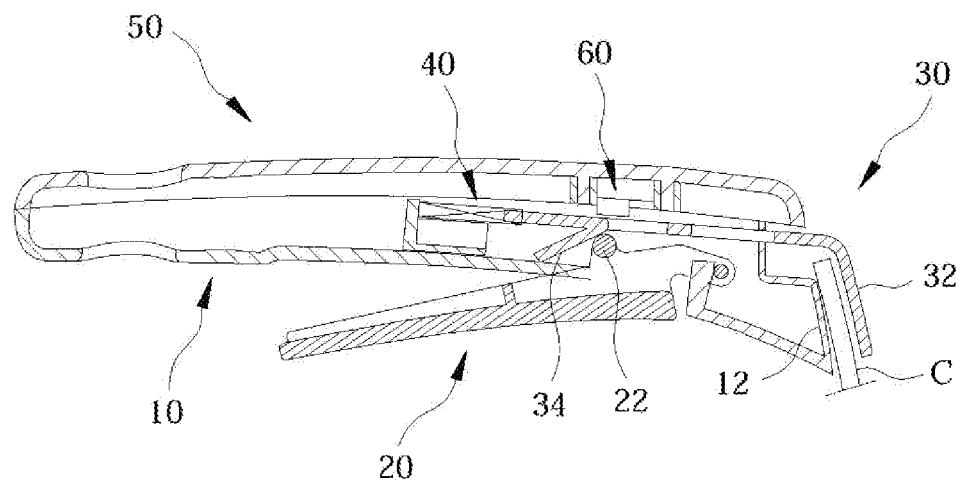
Figure 14C:
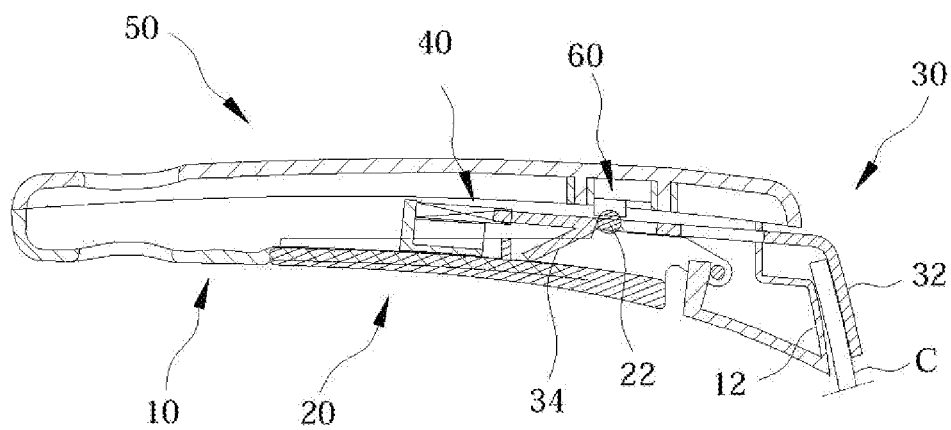

FIGS. 10a, 10b, and 10c are a configuration diagram illustrating a body portion and an elastic portion of a button of a detachable handle for a cooking vessel according to the present disclosure;

FIGS. 11a, 11b, and 11c are a configuration diagram illustrating a body support portion of a button of a detachable handle for a cooking vessel according to the present disclosure;

FIG. 12 is a cross-sectional view illustrating a coupling structure of a button and a cover of a detachable handle for a cooking vessel according to the present disclosure;

FIGS. 13a, 13b, and 13c are a cross-sectional view illustrating an operating state of a lever in a button pressing operation of a detachable handle for a cooking vessel according to the present disclosure; and FIGS. 14a, 14b, and 14c are a view illustrating an operating state of a detachable handle for a cooking vessel according to the present disclosure.

DETAILED DESCRIPTION OF THE EMBODIMENTS

Hereinafter, a detachable handle for a cooking vessel according to the present disclosure will be described in detail with reference to the accompanying drawings.

As illustrated in FIGS. 1 to 13, a detachable handle for a cooking vessel according to the present disclosure includes a body 10; a lever 20 hinged to a lower portion of the body 10; a pressing member 30 installed to be movable forwardly and backwardly in the body 10; a spring 40 elastically supporting the pressing member 30; a cover 50 installed at an upper portion of the body 10; and a button 60 installed through the cover 50.

The body 10 is formed to have a shape of a bar with an open upper portion, and a communication hole 11 is formed at a lower portion thereof.

The body 10 is preferably formed of a synthetic resin material having excellent physical properties.

Also, a vessel support portion 12 supporting one side of a cooking vessel (C, refer to FIG. 14) is integrally formed at a front end of the body 10, and a spring seating portion 14 in the form of a recess in which a spring 40 is accommodated to be seated is formed inside the vessel support portion 12.

In addition, a plurality of movement-preventing grooves 16 having a slit shape are formed side by side on a bottom surface of the body 10.

One end portion of the lever 20 is pin-coupled to the body 10 to be tilted at a predetermined angle with respect to the body 10, and an engaging portion 22 is formed to protrude in an upward direction inside the lever 20 inserted into the body 10.

The engaging portion 22 is positioned to correspond to the communication hole 11 of the body 10 to be in contact with the pressing member 30, and a rotary roller may be used as the engaging portion 22 in order to minimize damage (abrasion, etc.) according to an operation of the lever 20, as well as smoothly implementing an operation of the lever 20. The rotary roller is in rolling contact along an interworking guide 34b formed at the support portion 34 of the pressing member 30 according to a pulling operation of the lever 20.

For example, when the rotary roller is not used as the engaging portion 22, the operation of the lever 20 may not be smoothly performed or abrasion may occur due to friction with the pressing member 30.

Also, the rotary roller used as the engaging portion 22 is detachably coupled between a pair of coupling portions 26 integrally formed with the lever 20.

In addition, the lever 20 includes a movement preventing protrusion 24 coupled to the movement-preventing groove 16 of the body 10, and a coupling state with the body 20 may be firmly and stably maintained through the movement preventing protrusion 24.

Meanwhile, the lever 20 is formed of a synthetic resin material having excellent physical properties, and a magnetic component may be additionally included in the movement preventing protrusion 24 of the lever 20 and the movement-preventing groove 16 of the body 10 to further strengthen a coupling state between the lever 20 and the body 10.

The pressing member 30 is for selectively pressing the cooking vessel (C, refer to FIG. 14) according to a forwardly and backwardly motion thereof, and the pressing member 30 is preferably formed of a plate-shaped metal material.

Also, the pressing member 30 includes a vessel pressing portion 32 formed to be bent to correspond to the vessel support portion 12 of the body 10 and a support portion 34 selectively supporting the engaging portion 22 of the lever 20.

In particular, the support portion 34 includes a support 34a and an interworking guide 34b inclined downwardly from the support 34a.

The support 34a serves to firmly and stably press and support the engaging portion 22 of the lever 20, and the interworking guide 34b interworks with the movement of the engaging portion 22 of the lever 20 to simply and stably guide the engaging portion 22 to the support 34a.

The support 34a and the interworking guide 34b are easily formed by cutting a certain portion of a plate surface of the pressing member 30 and bending the same to be inclined downwardly, without using a separate member.

In addition, a fitting protrusion 36 fitted and supported to the spring 40 is integrally formed at an end portion of the pressing member 30.

Meanwhile, an anti-slip coating layer or an anti-slip groove may be additionally formed at a portion of the support 34a in contact with the engaging portion 22 of the lever 20 to prevent slipping and maintain a supported state of the engaging portion 22 more stably, and a rubber cover is provided on the vessel pressing portion 32 of the pressing member 30 in order to increase adhesion with the cooking vessel (C, refer to FIG. 14).

The spring 40 serves to elastically support the pressing member 30, while being seated on the spring seating portion 14 of the body 10.

The pressing member 30 may be elastically moved forwardly and backwardly by the spring 40.

Meanwhile, a variety of known types, including compression springs, may be selectively applied as the spring 40.

The cover 50 is formed of a synthetic resin material, is coupled to the body 10, and has a bar shape with an open lower portion.

Also, the cover 50 is detachably coupled to the body 10 by a screw or the like.

A pair of button installation holes 52 having a certain size is formed on both sides of the cover 50, and a pair of restraining protrusions 54 corresponding to each other at a predetermined interval is formed in a bar shape and side by side. In addition, at least one coupling protrusion 56 is formed to protrude between the pair of restraining protrusions 54.

The button 60 is formed to be elastically movable in the pair of button installation holes 52 formed on both sides of the cover 50.

The button 60 includes a pair of body portions 62 installed to be movable (forwardly and backwardly) and spaced apart from each other in the pair of button installation holes 52 and having a restraining groove 62a formed at an upper portion thereof and restrained by the restraining protrusion 54 of the cover 50 and a pressing protrusion 62b formed at a lower portion thereof; an elastic portion 64 interposed between the pair of body portions; and a plate-shaped body support portion 66 coupled to the coupling protrusion 56 of the cover 50.

The restraining groove 62a of the body portion 62 is for restraining the forwardly and backwardly movement according to the pressing operation of the body portion 62 and is formed relatively wider than a width of the restraining protrusion 54 of the cover 50. In addition, the pressing protrusion 62b interworks according to the pressing operation of the body portion 62 to press the engaging portion 22 of the lever 20 from both sides to release a supported state of the pressing member 30 on the support portion 34. For this purpose, the pressing protrusion 62b is formed so that a portion in contact with the engaging portion 22 of the lever 20 is inclined at a predetermined angle so that the lever 20 is naturally lowered by the pressing operation. Also, the body portion 62 includes an elastic portion fitting protrusion 62c for stably maintaining an installation state of the elastic portion 64, and a plurality of assembling protrusions 62d are formed on a lower surface of the body portion 62 to firmly and stably maintain a connection state with the body support portion 66.

The elastic portion 64 is for elastically operating the pair of body portions 62, and a known compression spring or the like is used.

A hollow 66a through which the pressing protrusion 62b of the body portion 62 passes is formed in the body support portion 66 to support the pair of body portions 62, thereby preventing the body portion 62 from being separated. Coupling holes 66b coupled to the coupling protrusion 56 of the cover 50 are formed at central upper and lower portions of the body support portion 66, and assembling grooves 66c are formed on both sides of the coupling holes 66b to be coupled to the assembling protrusions 62d of the body portion 62.

The operating state of the detachable handle for a cooking vessel described above will be described with reference to FIG. 14 as follows.

First, (a) of FIG. 14 shows a state in which the handle is detached from the cooking vessel C, and the lever 20 is tilted by a pressing operation of the buttons 60 located on both sides of the cover 50 and lowered with respect to the body 10, and the vessel pressing portion 32 of the pressing member 30 is maintained in a state spaced apart from the vessel support portion 12 of the body 10 by a predetermined distance.

At this time, the pressing member 30 maintains a state advanced by the spring 40, and the engaging portion 22 of the lever 20 is moved in a state in contact with the support portion 34 formed on the pressing member 30.

Also, when the lever 20 is pulled by a certain external force, the engaging portion 22 of the lever 20 is moved upwardly along the support portion 34 of the pressing member 30 as shown in (b) of FIG. 14 and supported on the support portion 34 by an elastic force of the spring 40, so that the handle is attached to the cooking vessel C as shown in (c) of FIG. 14.

Here, the pressing member 30, in a state of being elastically supported by the spring 40, moves forwardly and backwardly by contact with the engaging portion 22 of the lever 20.

What is claimed is:

1. A detachable handle for a cooking vessel, the detachable handle comprising:
    a body having a vessel support portion formed at a front end thereof;
    a lever hinged to a lower portion of the body and having an engaging portion formed to protrude inside thereof;
    a pressing member installed to be movable forwardly and backwardly in the body and including a vessel pressing portion corresponding to the vessel support portion and a support portion selectively supporting the engaging portion;
    a spring elastically supporting the pressing member;
    a cover installed at an upper portion of the body and having a pair of button installation holes formed on both sides thereof; and
    a button installed to be elastically movable in the cover, protruding to the outside through the pair of button installation holes, and pressing the engaging portion from both sides to release a supported state on the support portion,
    wherein
    a plurality of movement-preventing grooves having a slit shape are formed side by side on a bottom surface of the body,
    the lever includes a movement preventing protrusion coupled to the movement-preventing groove of the body,
    the support portion includes a support pressing and supporting the engaging portion; and an interworking guide inclined downwardly from the support and interworking with the engaging portion according to a pulling motion of the lever to guide the engaging portion to the support, the engaging portion is a rotary roller in rolling contact along the interworking guide,
    the pressing member is formed of a plate-shaped metal material,
    the support and the interworking guide are integrally bent to be inclined downwardly by cutting a certain portion of a plate surface of the pressing member,
    a pair of restraining protrusions corresponding to each other at a predetermined interval are formed side by side in the cover,
    at least one coupling protrusion is formed to protrude between the pair of restraining protrusions,
    the button includes a pair of body portions installed to be movable in the pair of button installation holes and having a restraining groove restrained by the pair of restraining protrusions, pressing protrusion formed to correspond to press the engaging portion from both sides to release a supported state on the support portion, and a plurality of assembling protrusions formed on a lower surface thereof;
    an elastic portion interposed between the pair of body portions; and
    a plate-shaped body support portion coupled to the coupling protrusion,
    wherein
    the body support portion includes a hollow through which the pressing protrusion passes, a coupling hole coupled to the coupling protrusion, and an assembling groove coupled to the assembling protrusion on both sides of the coupling hole.

2. The detachable handle of claim 1, wherein a spring seating portion on which the spring is seated is formed in the body.

* * * * *